United States Patent [19]
Knowlton et al.

[11] Patent Number: 5,346,034
[45] Date of Patent: * Sep. 13, 1994

[54] VEHICLE ENGINE MOUNTING SYSTEM

[75] Inventors: Christopher M. Knowlton, Pinehurst; Robert J. O'Hara, Soutern Pines, both of N.C.

[73] Assignee: AAR Corp., Elk Grove Village, Ill.

[ * ] Notice: The portion of the term of this patent subsequent to Aug. 11, 2009 has been disclaimed.

[21] Appl. No.: 873,247

[22] Filed: Apr. 24, 1992

Related U.S. Application Data

[62] Division of Ser. No. 458,083, Dec. 28, 1989, Pat. No. 5,137,108.

[51] Int. Cl.$^5$ .............................................. B60K 5/10
[52] U.S. Cl. ................................................ 180/298
[58] Field of Search ............... 180/298, 291, 289, 287, 180/211; 15/78, 70.2, 42, 50.2, 52, 52.1, 55.2; 414/493, 495; 137/576; D32/15, 16

[56] References Cited

U.S. PATENT DOCUMENTS

| | | | |
|---|---|---|---|
| 1,755,126 | 4/1930 | Martin | 180/298 |
| 3,113,332 | 12/1963 | Kasper | 15/82 |
| 3,783,964 | 1/1974 | Telesio | 180/294 |
| 4,364,138 | 12/1982 | Waldhauser et al. | 15/50.1 |
| 4,534,442 | 8/1985 | Botar | 180/280 |
| 4,770,427 | 9/1988 | Howell et al. | 180/298 |

FOREIGN PATENT DOCUMENTS

| | | |
|---|---|---|
| 553586 | 1/1960 | Belgium . |
| 486466 | 11/1929 | Fed. Rep. of Germany . |
| 2305387 | 2/1973 | Fed. Rep. of Germany . |
| 2305396 | 2/1973 | Fed. Rep. of Germany . |
| 2189754 | 11/1987 | United Kingdom . |

Primary Examiner—Richard M. Camby
Attorney, Agent, or Firm—Harness, Dickey & Pierce

[57] ABSTRACT

A sweeper vehicle having a unique engine/motor mounting arrangement whereby the engine/motor and accessories may be rotated out of the vehicle into a more accessible position for maintenance and the like, as well as a novel apparatus for clamping the engine/motor in its normal operating position and a safety interlock mechanism.

15 Claims, 5 Drawing Sheets

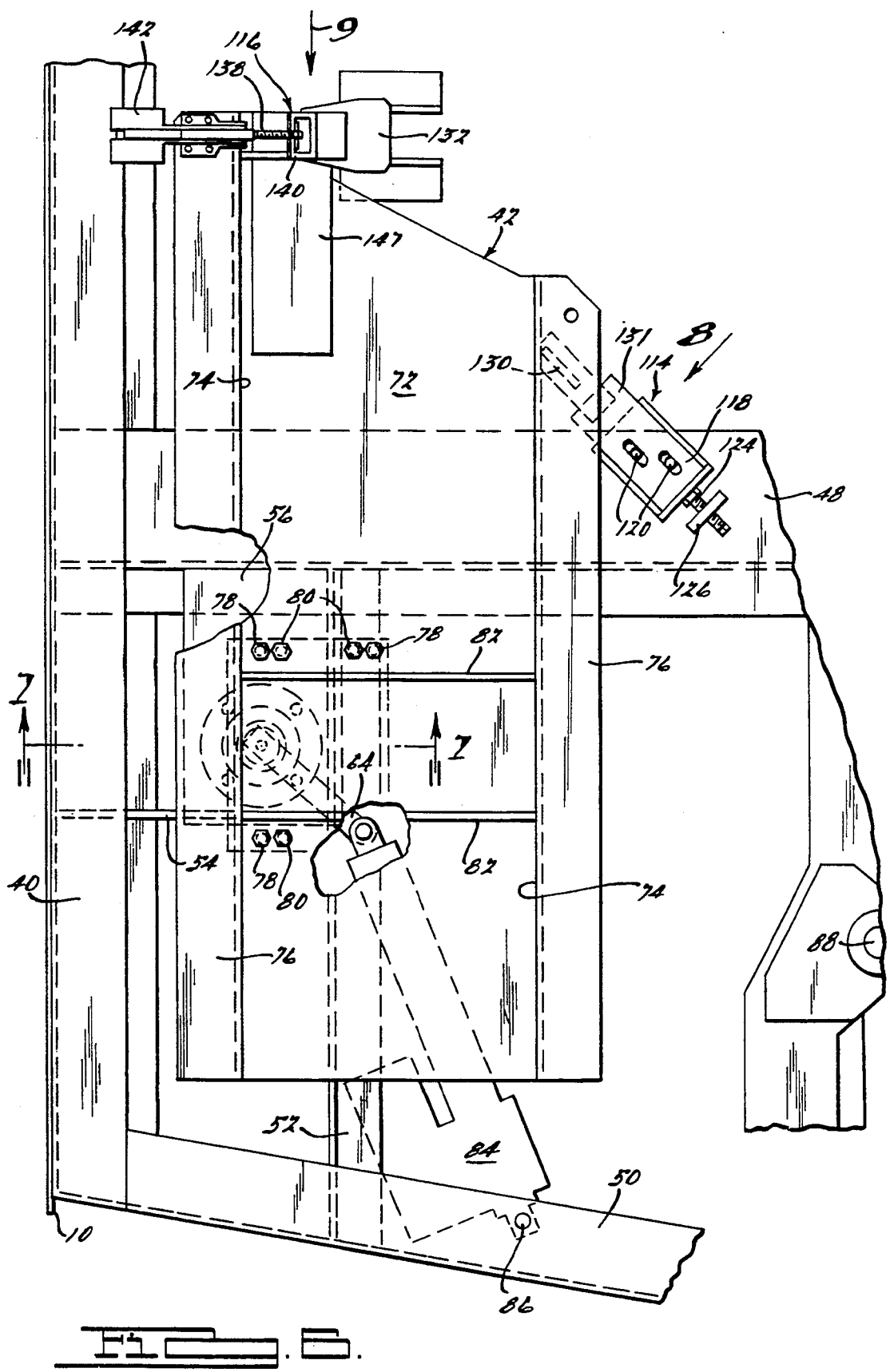

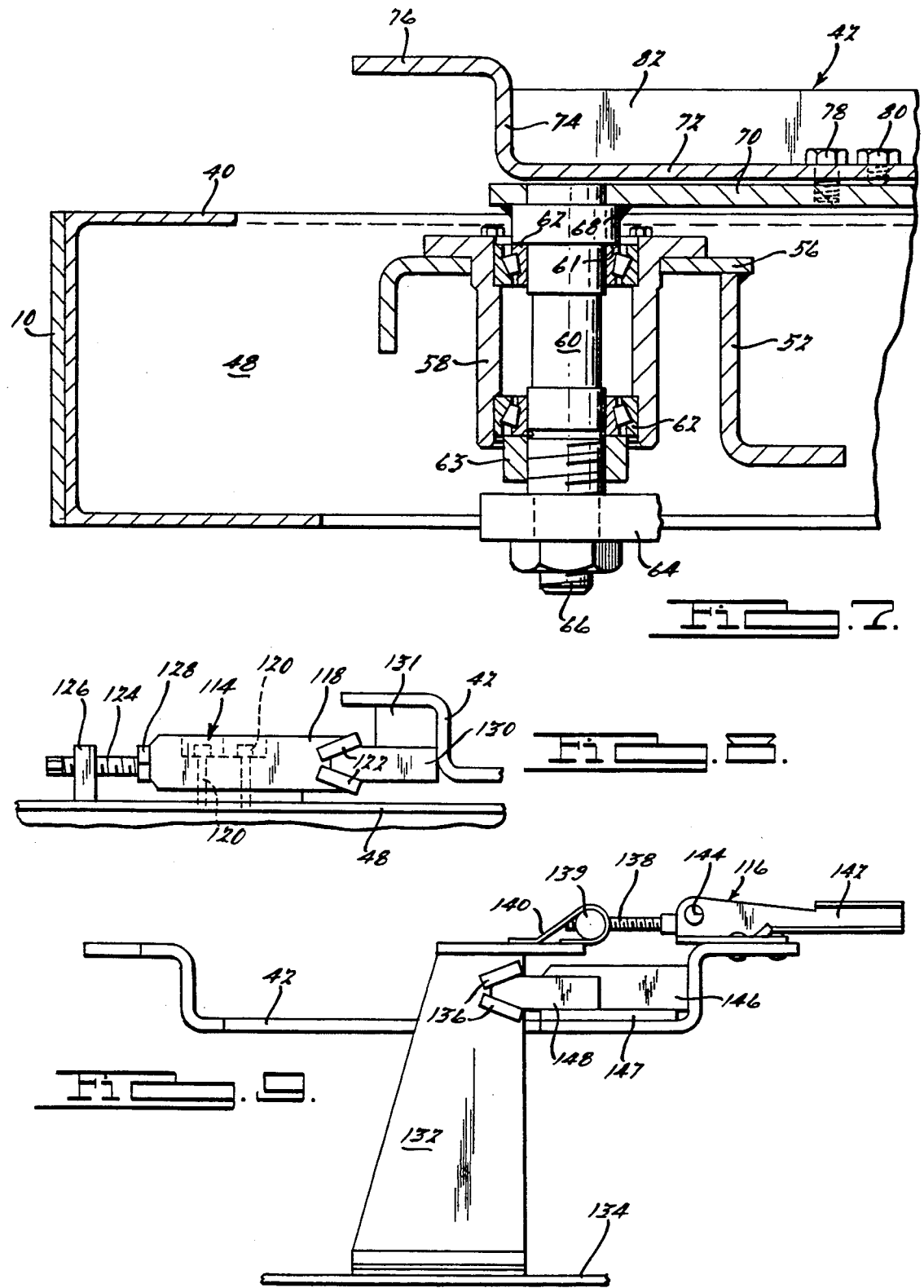

VEHICLE ENGINE MOUNTING SYSTEM

This is a division of U.S. patent application Ser. No. 07/458,083, filed Dec. 28, 1989 now U.S. Pat. No. 5,137,108.

BACKGROUND AND SUMMARY OF THE INVENTION

The present invention relates to powered vehicles and particularly to an internal combustion engine powered industrial vehicle having a unique layout and engine mounting arrangement which facilitates access to the engine and its accessories.

As is well recognized, industrial-type vehicles, or vehicles used in an industrial environment, are subject to very hard continuous and often abusive use and are consequently more in need of maintenance than many other types of equipment.

It is therefore a primary object of this invention to provide a vehicle layout and engine mounting arrangement which permits the engine and most of its accessories to be pivoted out of the engine compartment to a position in which there is ready access to virtually all parts of the engine and its accessories, thereby facilitating inspection, cleaning, maintenance, replacement and the like of the engine and/or accessories. This is believed to be particularly advantageous with respect to internal combustion engines (gasoline, gas or diesel), but is also of significant benefit to vehicles having relatively complex hydraulic systems regardless of whether powered by an internal combustion engine or only an electric motor.

Related objects of the invention reside in the provision of such a vehicle which is easy to operate to accomplish the desired access, which has durable and accurate means for mechanically locking the engine in place for normal operation, which has provision for easy adjustment of engine position and which provides all the necessary safety lockouts to prevent the engine from being actuated to its full-access position while being operated or operable.

These and other objects and advantages will become more apparent when viewed in light of the accompanying drawings and following detailed description.

DESCRIPTION OF THE DRAWING FIGURES

FIG. 5 is a view similar to FIG. 2 but showing the engine swung out to its fully accessible position;

FIG. 6 is a fragmentary top plan view of the engine supporting apparatus of the present invention with parts broken away and the engine and accessories removed;

FIG. 7 is a vertical sectional view taken along line 7—7 in FIG. 6;

FIG. 8 is a partial side elevational view looking in the direction of arrow 8 in FIG. 6;

FIG. 9 is a partial side elevational view looking in the direction of arrow 9 in FIG. 6;

DETAILED DESCRIPTION OF THE PREFERRED EMBODIMENT

Figure 1:
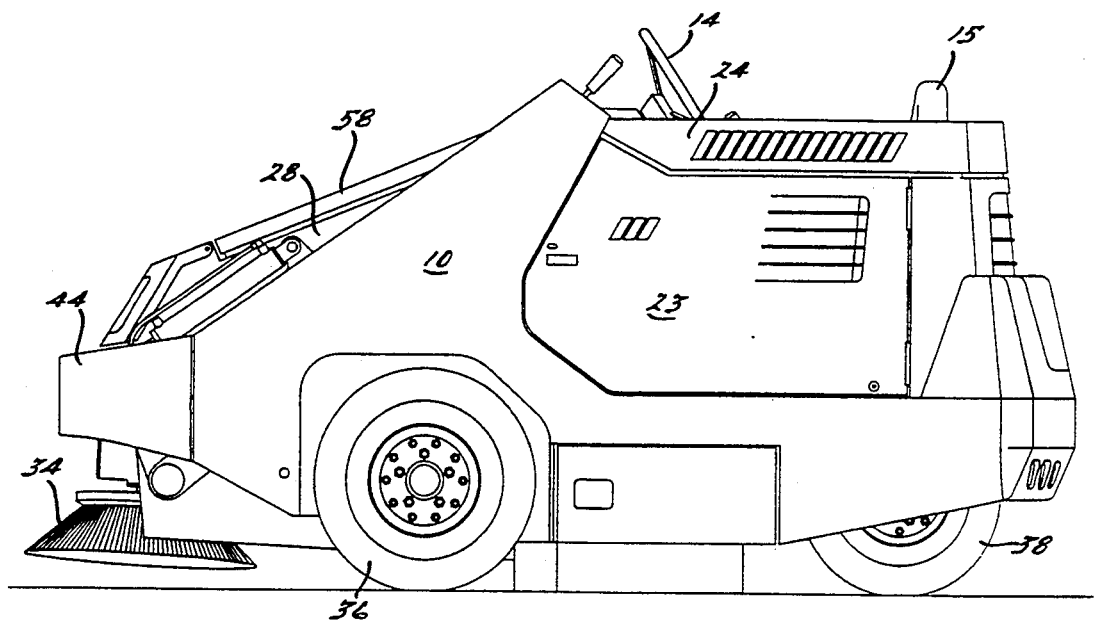
FIG. 1 is a side elevational view of the left side of a sweeper vehicle embodying the present invention.

The present invention is applicable to numerous types of vehicles, but is particularly useful in connection with vehicles subject to heavy (higher maintenance) industrial usage, such as sweeper vehicles, fork lift trucks, etc. The preferred embodiment of the invention is therefore disclosed for exemplary purposes incorporated in s sweeper vehicle.

Referring first to FIGS. 1-5, the overall sweeper vehicle comprises a body 10 supported on a conventional frame (not shown in these figures) and defining: an open operator's compartment 12 having the usual steering wheel 14, a seat 15, foot pedals 16, instruments 18 and hydraulic controls 20; a rear engine compartment 22 having a side door 23, a hinged hood 24, and having disposed therein a conventional engine 25 (FIGS. 2, 4 and 5) arranged in a fore-aft orientation and cooled by a rearward facing fan and radiator 27, and a conventional variable capacity hydraulic pump 29 and hydrostatic transmission powered by engine 25; a forward hopper receiving cavity 26 in which a hopper 28 is mounted for loading, lifting and dumping; a conventional sweeper assembly 30 including a rotary broom 32 for sweeping refuse into hopper 28; and an optional rotary side brush 34. The vehicle also includes a pair of conventional front driven wheels 36 and a single steerable rear wheel 38 of the usual type. Except for the novel features hereinafter described, the vehicle is constructed and functions in a conventional manner. Power is applied to wheels 36 by hydraulic motors (not shown) powered by pump 29.

Figure 4:
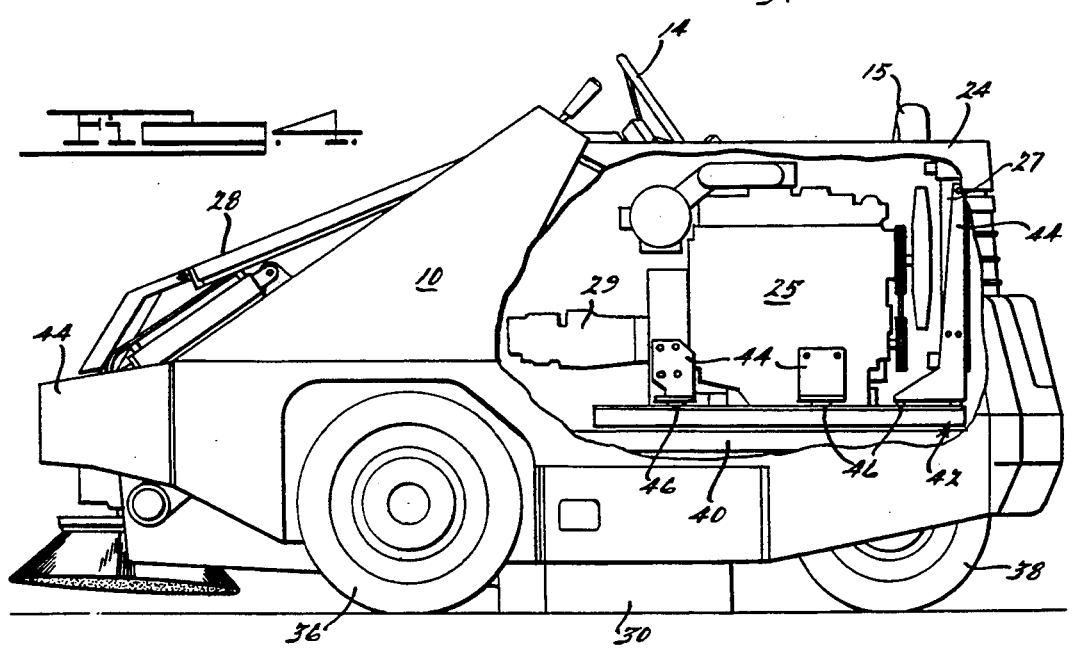
FIG. 4 is a view similar to FIG. 1, but with parts broken away to show the engine and how it is mounted.

The present invention resides in a unique engine (or motor) mounting concept whereby the engine may be very easily rotated about a vertical axis with respect to the vehicle to a position projecting therefrom in which it is almost fully accessible for inspection, cleaning, maintenance, replacement or the like. As best seen in FIG. 4, the sweeper vehicle has the usual frame, a portion of a longitudinally extending frame member of which is shown at 40, on which is pivotally mounted an engine support pan 42 to which engine 25 is mounted using a plurality of right-angle mounting brackets 44 bolted to engine 25 and to pan 42, with an elastomeric isolating pad 46 disposed between each bracket and the pan. Radiator 27 is similarly mounted to pan 42.

With reference to FIGS. 6 and 7, the vehicle frame also includes transverse frame members 48 and 50 affixed at one end to frame member 40. A further longitudinal frame member 52 extends between and is affixed to members 48 and 50, and a further transverse frame member 54 extends between members 40 and 52. A bearing support plate 56 having a bearing housing 58 bolted to the top thereof is affixed to member 48 and to the tops of members 52 and 54. A vertical shaft 60 is journalled in housing 58 by a pair of tapered roller bearings 62, the assembly being held together by shoulder 61 and threaded collar 63. A crank arm 64 is nonrotatably affixed to the bottom of shaft 60 by a nut 66, whereby rotation of crank 64 will cause pan 42 to rotate about a vertical axis. Permanently affixed to the top of shaft 60, as by welds 68, is an engine support plate 70.

Pan 42 is of a generally inverted hat-shape in cross-sectional configuration, including a flat bottom wall 72, a pair of longitudinally extending side walls 74 each having a longitudinally extending mounting flange 76 to which engine mounting brackets 44 are bolted (the engine and its mounts are not shown in FIGS. 6 and 7). Engine support plate 70 is bolted to bottom wall 72 of pan 42 by means of a plurality of bolts 78 which extend through pan 42 and threadably engage plate 70. Adjustment of the exact relationship between pan 42 (and hence engine 25) and the remainder of the vehicle is accomplished by a plurality of bolts 80 extending downwardly through and threadably engaging bottom wall 72 and engaging the top surface of plate 70. Pan 42 is stiffened in the vicinity of the bearing by means of a pair of partitions 82 rigidly affixed to the upper surface thereof.

Figure 2:
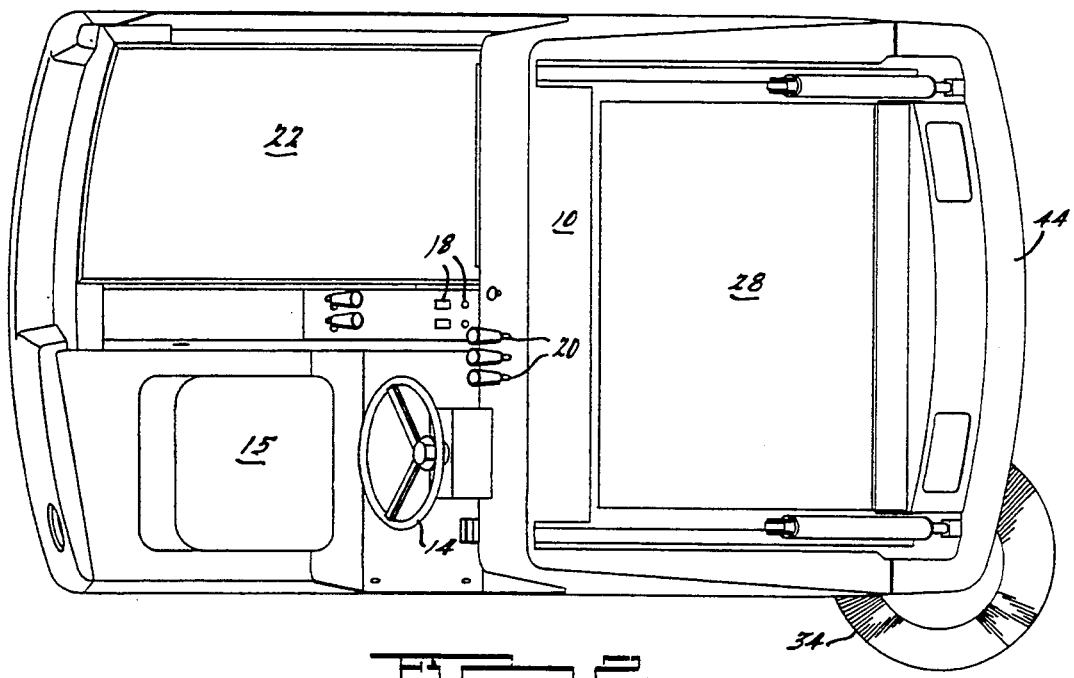
FIG. 2 is a top plan view of the vehicle of FIG. 1.
Figure 3:
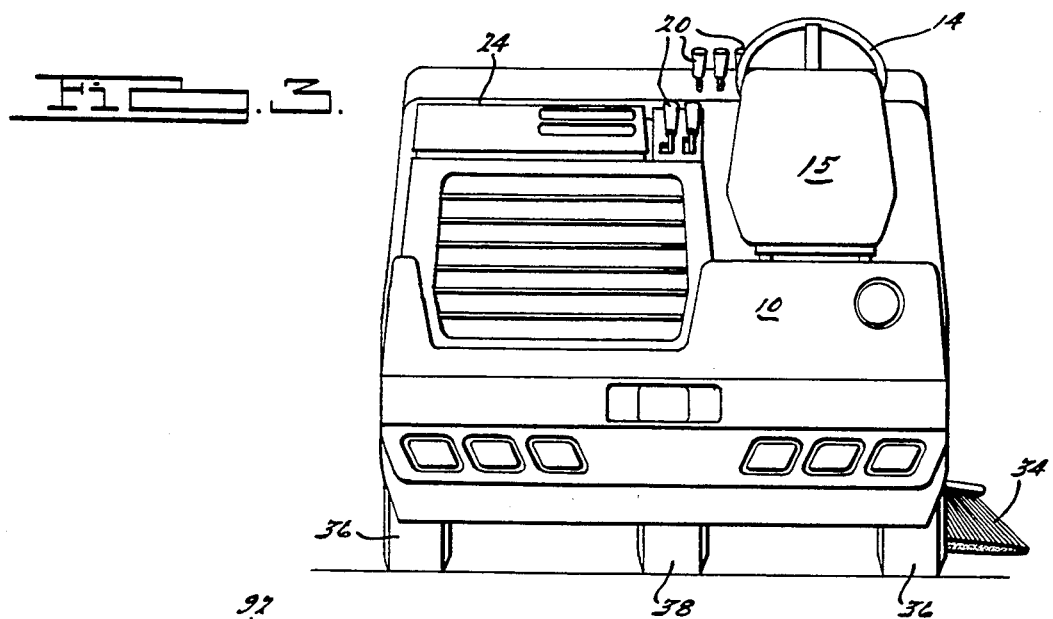
FIG. 3 is a rear elevational view of the vehicle of FIG. 1.

Actuation of crank 64 to cause the engine and its accessories to rotate from its normal position shown in FIGS. 2 and 4 to its position shown in FIG. 5, is accomplished using a conventional electrically powered ball-screw linear actuator 84 pivotally affixed to frame member 50 at 86 in any suitable manner. As best seen in FIG. 6, electrical actuation of actuator 84 from its retracted position shown will cause crank 64 to rotate in a counter clockwise direction to rotate the engine and its accessories to the position of maximum accessibility shown in FIG. 5. The pivotal axis of shaft 60 is positioned so that the swinging parts clear all of the fixed structure (e.g., the rear wheel pivot 88) and so that the end of the engine having the most accessories requiring service, i.e., the forward end having the hydraulic pump, transmission, etc., is made the most accessible. For clarity all of the flexible hoses connected to the hydraulic devices are not shown, nor is the flexible fuel line, but because of their flexibility the rotational displacement illustrated is easily accomplished without disconnecting any fluid lines. Similarly, most of the standard flexible cables used for engine and pump control are not shown, but as can be visualized they can easily accommodate rotation of the engine and pump.

Figure 10:
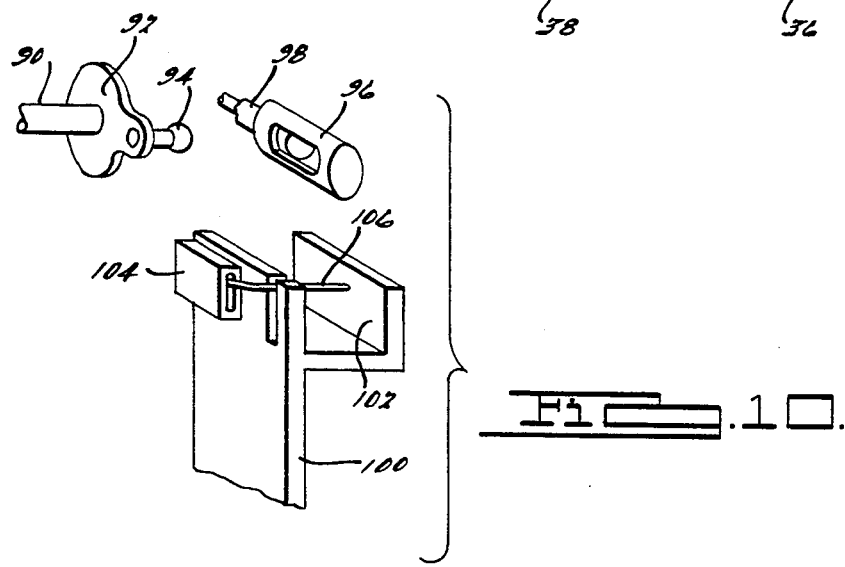
FIG. 10 is a diagrammatic partial perspective view of the interlock device of the present invention.
Figure 11:
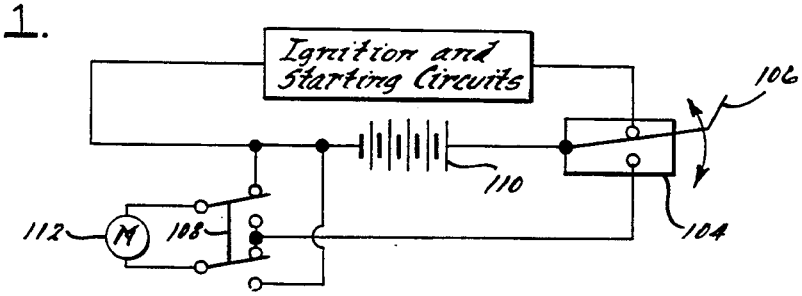
FIG. 11 is a simplified schematic wiring diagram of an exemplary interlock circuit which can be used with the present invention.
Figure 3:
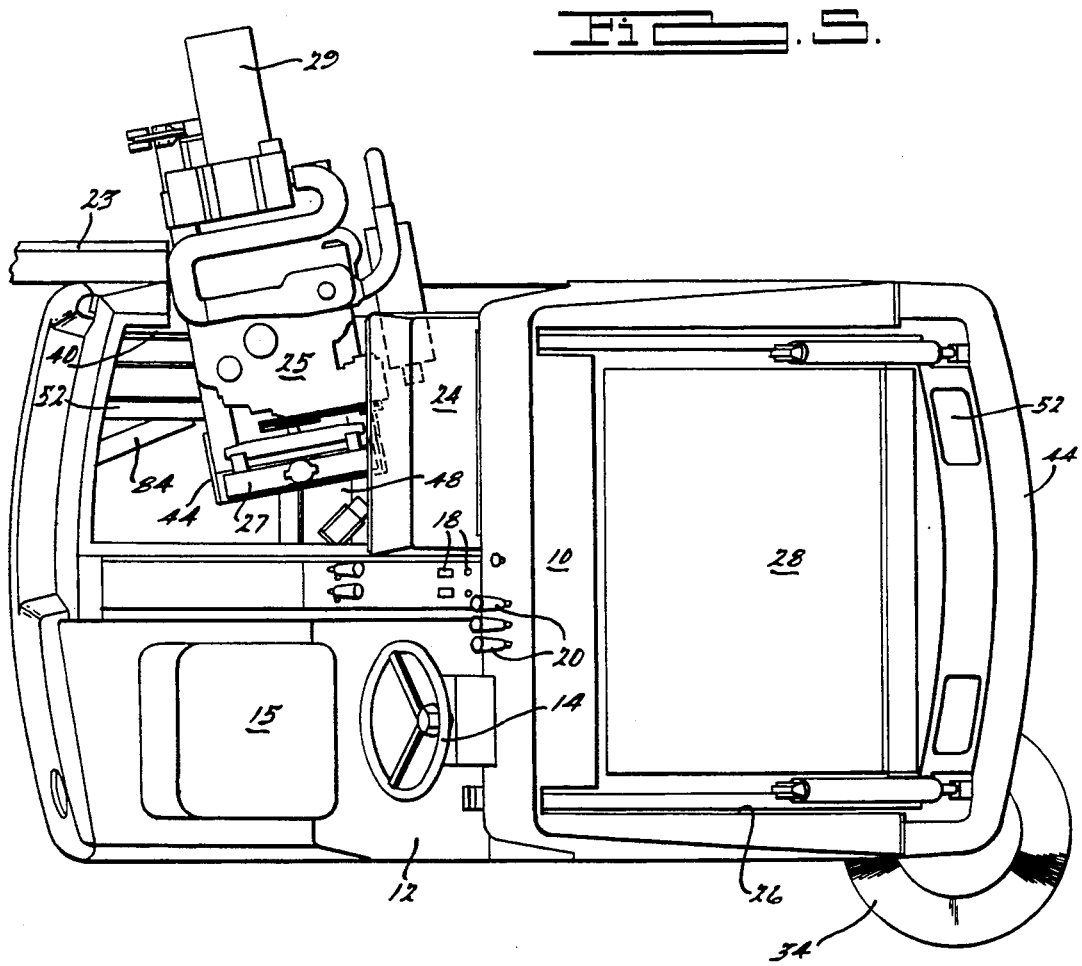

The only element which must be disconnected is the transmission shift selector cable, and this fact provides a unique way to provide a safety interlock to prevent rotating the engine out of the engine compartment when it is running or runable. Referring to FIG. 10, shaft 90 represents the transmission shift selector shaft which has at its free end a crank 92 having an actuating ball 94 projecting laterally therefrom. During normal operation, as can be visualized, ball 94 is operatively engaged by a quick-release ball connector 96 affixed to the end of a conventional control cable 98, the opposite end of which is connected to the proper control 20. However, when it is desired to rotate the engine outwardly for access, hood 24 and door 23 are opened and connector 96 is manually disconnected from ball 94 and merely dropped into a holder 100 having a connector retaining channel 102 and a microswitch 104 having an actuator 106 which actuates switch 104 whenever the connector is put in the channel or removed therefrom. As can be seen from FIG. 11, switch 104 now places a suitably located reversible actuating switch 108 in connection with the vehicle battery 110 and a motor 112 forming part of linear actuator 84. At the same time the normal vehicle engine ignition and starting circuits are disconnected from vehicle power, thus providing a safety lock-out. Switch 108 can then be manually actuated in the proper directions to actuate motor 112 to swing engine 25 to the desired position. The limits of travel of the engine may be restricted in any suitable manner, such as by the use of conventional limit switches in the circuit, physical stops and clutching the output of motor 12, and/or the like. The engine is rotated back to its normal position by merely actuating switch 108 in the opposite direction. As an alternative arrangement, the engine could be manually rotated between its two positions.

Referring to FIGS. 6, 8 and 9, pan 42 (and hence engine 25) is accurately locked in position by means of a locating assembly 114 and a manually actuatable clamp 116. As best shown in FIGS. 5, 6 and 8, assembly 114 comprises a body 118 adjustably but rigidly affixed to frame member 48 by means of a pair of bolts 120 passing through appropriate adjusting slots in body 118, a pair of fixed Jaws 122 at one end of body 118 defining a V-shaped slot and at the opposite end a threaded adjusting screw 124 passing through a threaded abutment 126 fixed to frame member 48, and a locking nut 128 threadably engaging screw 124 and abutting the end of body 118. The V-shaped slot defined by Jaws 122 is adapted to normally freely engage and therefore accurately locate a catch 130 having a complimentary V-shaped configuration at one end and being rigidly affixed at its opposite end to pan 42 by means of a support 131.

Clamp 116, best seen in FIGS. 6 and 9, comprises a support 132 rigidly affixed to the vehicle frame, a portion of which is indicated at 134, a pair of jaws 136 defining a V-shaped slot, and a conventional toggle clamp comprising a threaded arm 138 pivotally connected at one end (when engaged) to support 132 by a threaded cross-piece 139 engaging a strap 140 and at the other end to a manually actuatable handle 142 which is pivotally mounted at 144 to pan 42. Also rigidly affixed to pan 42, by means of a support 146 and a reinforcing plate 147, is a catch 148 having a V-shaped nose complimentary in shape to and normally tightly engaging the slot defined by Jaws 136. The clamp is opened by raising handle 142 which causes arm 138 to move over center and then to the left as shown in FIG. 9 to a point where cross-piece 139 can be manually lifted out of strap 139 in the usual manner. Once hood 24 and door 23 are opened, clamp 116 is opened, and connector 96 is placed in holder 100, switch 108 can be actuated to cause actuator 84 to rotate the engine outwardly to the desired accessible position. To move the engine back to its normal operating position, the procedure is simply reversed. Clamp 116 is closed by placing cross-piece 139 in strap 140 and then moving the handle to the over-center position shown in FIG. 9. Such movement causes pan 42 and hence catches 130 and 148 to be drawn tightly Into the positions determined by jaws 122 and 136 to accurately position engine 25. This final position is determined at the time of vehicle assembly by the location of the pivotal axis of shaft 60, the adjusted position of adjustment screws 80, the adjusted position of body 118 on frame member 48 (maintained by lock nut 128) and the adjusted position of cross-piece 139 on threaded arm 138.

Although the invention has been described in connection with an engine located in the left rear quadrant of the vehicle, it will be appreciated that it is also applicable to vehicles having the engine in other locations.

While this invention has been described in connection with a particular example, no limitation is intended except as defined by the following claims. The skilled practitioner will realize that other modifications may be made without departing from the spirit of this invention after studying the specification and drawings.

We claim:

1. A sweeper vehicle having a layout in plan comprising four roughly equal sized quadrants, the front two quadrants comprising a hopper and a hopper lifting and dumping linkage system, the right rear quadrant comprising an operator's compartment and including necessary vehicle and hopper controls, and the left rear quadrant comprising an engine and an engine compartment having a pivotal top hood, a pivotal side door and engine support means, said support means being pivotal about a generally vertical axis to swing said engine between a first normal engine-operating position and a second position in which said engine projects from said vehicle in an exposed condition facilitating access thereto, and shutoff means for rendering said engine inoperative before said support means reaches said second position when moving said support means from said first position.

2. A vehicle as claimed in claim 1 further comprising a steerable rear wheel disposed generally between said rear quadrants.

3. A vehicle as claimed in claim 2, further comprising driven wheels at opposite sides of said front two quadrants.

4. A vehicle comprising frame means, vehicle power means including a power source and a hydraulic pump for powering said vehicle, support means for supporting said power source, said support means being pivotally mounted to said frame means for movement between a first normal engine-operating position and a second position in which said hydraulic pump projects from said vehicle in an exposed condition facilitating access thereto, and shutoff means for rendering said power source inoperative before said support means reaches said second position when moving said support means from said first position.

5. A vehicle as claimed in claim 4, further comprising motor means for moving said support means between said first and second positions.

6. A vehicle as claimed in claim 4 wherein said shutoff means further comprises sensing means for sensing when said support means is ready to move to said second position and in response thereto for rendering said power source inoperative.

7. A vehicle as claimed in claim 6 further comprising control means for transmitting control information to said powering means, and manually disconnectable connecting means for connecting said control means to said powering means, said sensing means sensing when said control means has been disconnected from said powering means.

8. A vehicle as claimed in claim 4 wherein said support means rotates about a vertical axis between said first and second positions.

9. A vehicle as claimed in claim 4 further comprising at least one catch operative between said support means and said frame means to accurately position said powering means in its normal operative position.

10. A vehicle as claimed in claim 9 wherein said catch includes a V-shaped slot in one of said support means or frame means and a complimentary V-shaped projection on the other of said support means or frame means.

11. A vehicle as claimed in claim 10 wherein said catch further includes a manually actuatable toggle clamp for engaging said catch and connecting said support means to said frame means.

12. A vehicle as claimed in claim 4 wherein said vehicle is a sweeper vehicle comprising two front driven wheels, a transverse rotating broom and a steerable single rear wheel.

13. A vehicle as claimed in claim 1 further comprising motor means for moving said support means between said first and second positions.

14. A vehicle as claimed in claim 1 wherein said shutoff means further comprises sensing means for sensing when said support means is moved to said second position and in response thereto for rendering said power source inoperative.

15. A vehicle as claimed in claim 14 further comprising control means for transmitting control information to said engine, and manually disconnectable connecting means for connecting said control means to said engine, said sensing means sensing when said control means has been disconnected from said engine.

* * * * *